US008293355B2

(12) United States Patent
Kimura et al.

(10) Patent No.: US 8,293,355 B2
(45) Date of Patent: Oct. 23, 2012

(54) GLOSSY PAPER

(75) Inventors: Masaharu Kimura, Daito (JP); Masatsugu Ohishi, Nishinomiya (JP); Yasuaki Fukada, Nara (JP); Masaya Asakawa, Yamatokoriyama (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 370 days.

(21) Appl. No.: 12/266,006

(22) Filed: Nov. 6, 2008

(65) Prior Publication Data

US 2009/0142550 A1 Jun. 4, 2009

(30) Foreign Application Priority Data

Dec. 3, 2007 (JP) ................................ 2007-312767

(51) Int. Cl.
*B32B 3/00* (2006.01)
*B41M 5/00* (2006.01)

(52) U.S. Cl. .................... 428/156; 428/32.17; 428/32.2; 428/32.22

(58) Field of Classification Search .................. 428/141, 428/32.17, 32.18, 32.22, 32.2, 156
See application file for complete search history.

(56) References Cited

U.S. PATENT DOCUMENTS

| | | | | |
|---|---|---|---|---|
| 6,455,206 | B1 * | 9/2002 | Hasegawa et al. | 430/7 |
| 6,699,565 | B2 * | 3/2004 | Kikuchi et al. | 428/156 |
| 2005/0208252 | A1 * | 9/2005 | Hannington et al. | 428/40.1 |

FOREIGN PATENT DOCUMENTS

| | | | |
|---|---|---|---|
| JP | 05-108012 | | 4/1993 |
| JP | 09-020080 | | 1/1997 |
| JP | 2001-255688 | A | 9/2001 |
| JP | 2001-260529 | A | 9/2001 |
| JP | 2002-172854 | A | 6/2002 |
| JP | 2005-015079 | | 1/2005 |
| JP | 2006-168840 | | 6/2006 |
| JP | 2007-107141 | A | 4/2007 |

* cited by examiner

*Primary Examiner* — Donald J Loney
(74) *Attorney, Agent, or Firm* — Nixon & Vanderhye P.C.

(57) ABSTRACT

In the present glossy paper, an opposite surface of a glossed and smooth image formation surface is rough-surfaced. Therefore, the glossy paper do not adhere together even under the high-temperature and high-humidity environment. In fact, the present invention provides glossy paper which can advantageously achieve a continuous paper feeding in the image forming apparatus regardless of the use environment conditions.

3 Claims, 4 Drawing Sheets

GLOSSY PAPER

This Nonprovisional application claims priority under U.S.C. §119(a) on Patent Application No. 312767/2007 filed in Japan on Dec. 3, 2007, the entire contents of which are hereby incorporated by reference.

FIELD OF THE INVENTION

The present invention relates to glossy paper for image formation.

BACKGROUND OF THE INVENTION

In an image forming apparatus conventionally, a toner image produced on a surface of a photoreceptor drum is transferred on a transfer paper and the transferred toner image is fixed on the surface of the transfer paper by heat and pressure in order to produce an image. In such an image forming apparatus, general standard paper is contained in a paper feeding cassette according to sizes and is transported from the cassette to the transferring process.

If, on the other hand, special paper such as glossy paper is transported from the paper feeding cassette, its high paper firmness and high surface smoothness likely cause multi feed, mispick, slip or jam when feeding the special paper. The special paper should thus be fed one by one from a manual paper feeding tray.

For example, Japanese unexamined Patent Publications Nos. 2005-15079 (published on Jan. 20, 2005) and 2006-168840 (published on Jun. 29, 2006) disclose a technique for feeding special paper such as glossy paper from a paper feeding cassette.

SUMMARY OF THE INVENTION

However, due to the high surface smoothness of the glossy paper, such a phenomenon is occurred that the glossy paper adheres together particularly under high-humidity environment. In the above conventional arts, continuous feeding of the glossy paper can only be achieved by strictly limiting use environment. Under normal use, the continuous feeding of the glossy paper poses a problem of frequent occurrences of paper feeding defect, such as multi feed, mispick, slip, jam and the like.

The present invention is accomplished in view of the aforementioned problems. An object of the present invention is to provide glossy paper which can continuously be fed in an image forming apparatus in an advantageous manner regardless of use environment conditions.

In order to attain the object, glossy paper according to the present invention for image formation, the glossy paper having a glossed and smooth image formation surface, is arranged such that an opposite surface of an image formation surface is rough-surfaced.

This reduces an adhesion area between a plurality of glossy paper stacked on one another. The adhesion of the glossy paper under high-humidity can thus be prevented. Consequently, it is possible to feed the glossy paper according to the present invention continuously in an image forming apparatus even under high-temperature and high-humidity environment. In fact, the glossy paper according to the present invention can prevent occurrence of paper feeding defect, such as multi feed, mispick, slip, jam and the like regardless of use environment conditions, so that continuous paper feeding in an image forming apparatus is advantageously achieved. Also, decreased occurrence of the paper feeding defect makes it possible to drastically reduce the number of the glossy paper (waste) which must be removed because of the paper feeding defect compared with that of the conventional arts and to save expensive glossy paper.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 2(*b*) is a diagram illustrating an example of the embossed pattern formed on the back surface of the glossy paper.

FIG. 2(*c*) is a diagram illustrating an example of the embossed pattern formed on the back surface of the glossy paper.

FIG. 2(*d*) is a diagram illustrating an example of the embossed pattern formed on the back surface of the glossy paper.

DESCRIPTION OF THE EMBODIMENTS

The following description set forth a most preferred embodiment to put the present invention into practice in reference to the drawings.

Figure 1:
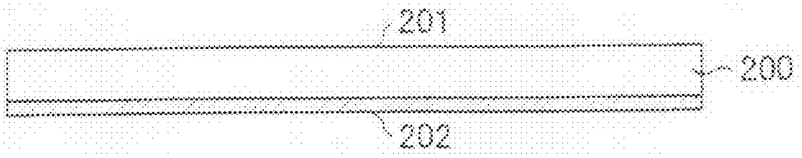
FIG. 1 is a diagram illustrating a glossy paper according to a first embodiment of the present invention.
Figure 2A:
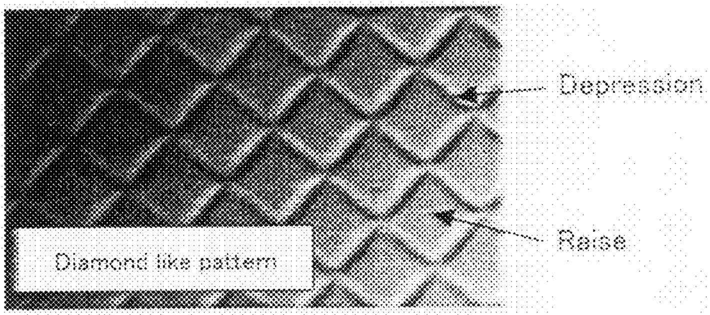
FIG. 2(*a*) is a diagram illustrating an example of an embossed pattern formed on a back surface of the glossy paper.
Figure 2B:
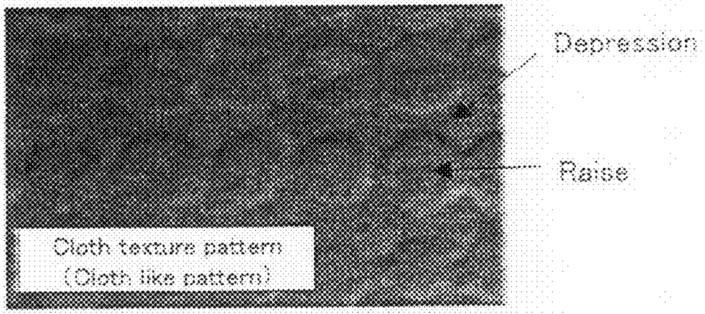
Figure 2C:
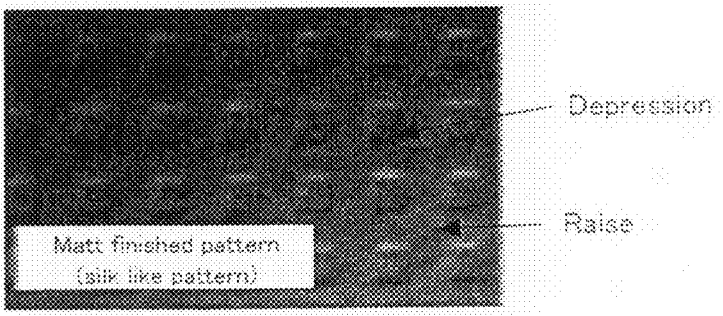
Figure 2D:
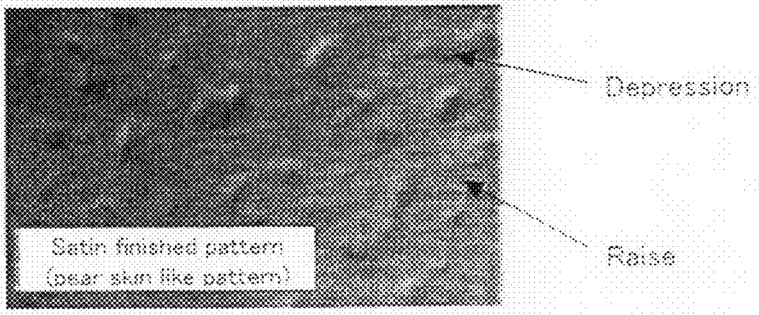

As shown in FIG. 1, glossy paper 200 according to the present invention comprises a glossed and smooth image formation surface 201 and a surface 202 (referred to as the back surface hereinafter) opposite to the image formation surface 201. The image formation surface 201 is a surface on which an image is/is to be formed by the image forming apparatus described later. The back surface 202 is rough-surfaced. The back surface 202 may or may not be glossed.

The rough-surfacing carried out on the back surface 202 reduces an adhesion area between stacked pieces of the glossy paper 200. This thus makes it possible to prevent the glossy paper 200 from adhering together in high-humidity. Accordingly, the use of the glossy paper 200 allows continuous paper feeding in an image forming apparatus even under the high-temperature and high-humidity environment. In fact, the present glossy paper 200 prevents the occurrence of paper feeding defect such as multi feed, mispick, slip, jam and the like regardless of use environmental conditions and allows an image forming apparatus to perform good continuous paper feeding.

The back surface 202 which is rough-surfaced preferably has a degree of smoothness of 16 kPa or greater, the degree of smoothness being measured by a smoothter. The back surface 202 will be described in a later embodiment in detail. With the degree of smoothness of 16 kPa or greater, the adhesion between the glossy paper can further be prevented so that the problem associated with the paper feeding can effectively be avoided, thereby making it possible to perform continuous paper feeding.

The rough-surfacing of the back surface 202 may be carried out for example by embossing. The embossing can easily rough-surface the back surface 202 of the glossy paper 200.

Preferably, rough-surfacing is carried out not so deeply as to affect on the image formation surface 201. This expression "affect on the image formation surface 201" means that a depression produced on the back surface 202 influences the image formation surface 201 and badly affects the quality of the image printed on the image formation surface 201.

Further preferably, rough-surfacing is carried out so deeply as to enable a user to visually distinguish the image formation surface 201 and the back surface 202. If both surfaces cannot be distinguished from each other visually, it would cause a user to set the glossy paper 200 with incorrect side into the paper feeding cassette of the image forming apparatus.

FIGS. 2(*a*)-2(*d*) show examples of the embossed pattern formed by embossing.

FIG. 2(*a*) illustrates a diamond pattern formed in such a way that its depressions are connected with one another and aligned. FIG. 2(*b*) illustrates a cloth texture pattern (cloth like pattern) formed in such a way that its depressions are connected with one another and aligned. FIG. 2(*c*) illustrates a matt finished pattern (silk like pattern) formed in such a way that its depressions are not connected with one another and aligned. FIG. 2(*d*) illustrates a satin finished pattern (pear skin like pattern) formed in such a way that its depressions are not connected with one another and aligned.

When the depressions of the embossed pattern are connected with one another, air between the back surface 202 of the glossy paper 200 and the image formation surface 201 of another glossy paper set under the glossy paper 200 can be vent efficiently. When the depressions are not connected with one another, air cannot vent very well. Consequently, it is possible to achieve good air ventilation and to prevent the occurrence of problem caused in the image forming apparatus during the continuous paper feeding more effectively by rough-surfacing the back surface 202 of the glossy paper in such a pattern that the depressions on the back surface 202 are connected with one another and aligned.

Figure 3:
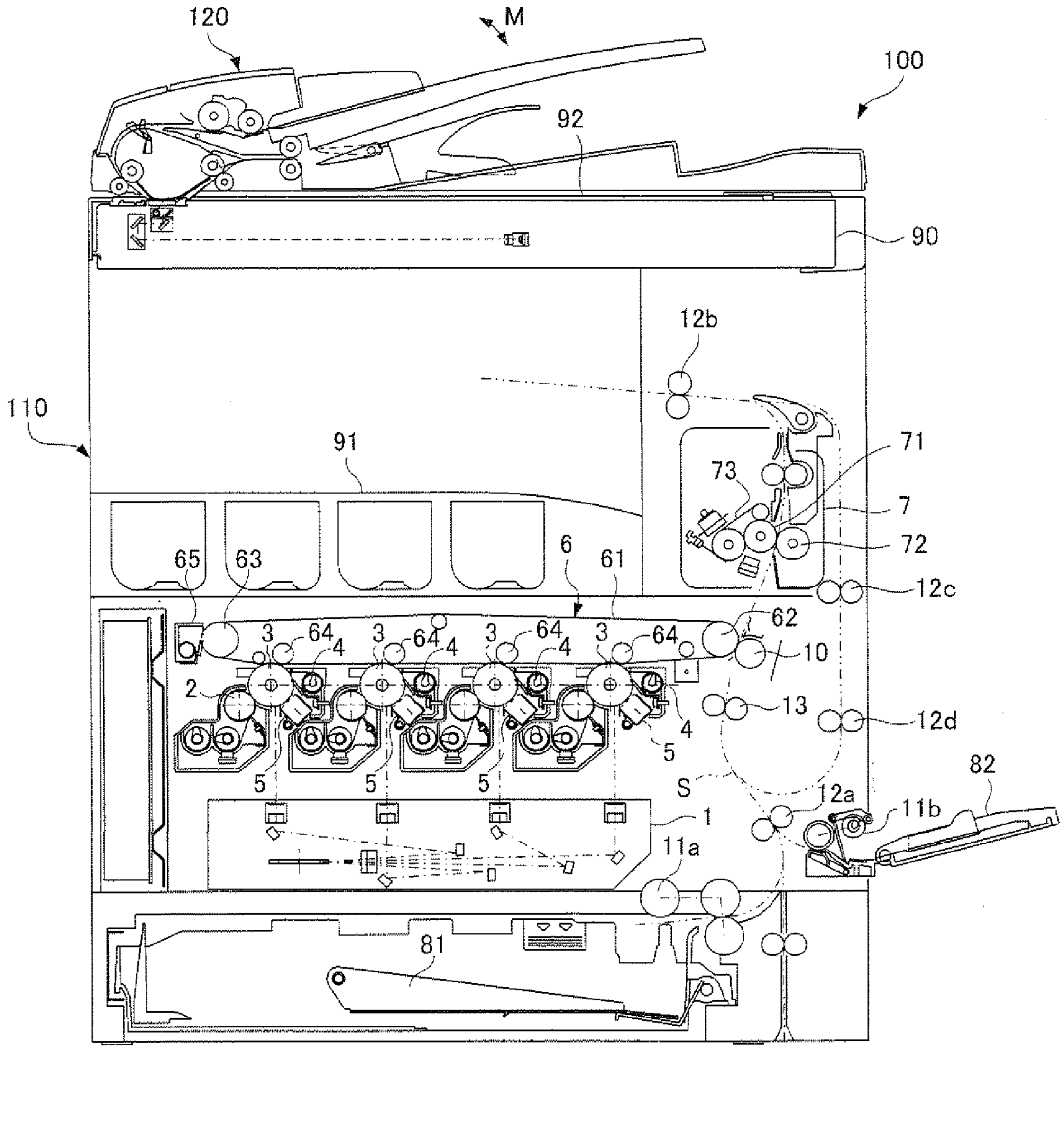
FIG. 3 is a diagram illustrating an example of an arrangement of an image forming apparatus.

Next, the image forming apparatus into which the glossy paper 200 of the present embodiment is loaded will be described in reference to FIG. 3. The image forming apparatus 100 produces a color or monochrome image on a sheet (recording paper) according to image data received externally. The image forming apparatus 100 includes a main body 110 and a document process device 120.

The main body 110 includes an exposure unit 1, a developing device 2, a photoreceptor 3, a cleaner unit 4, a charging device 5, an intermediate transfer belt unit 6, a fixing unit 7, a paper feeding cassette 81, a paper output tray 91 and the like. A document set table 92 on which document is to be placed is provided in an upper part of the main body 110, the document set table 92 being made of transparent glass. A document process device 120 is mounted on the document set table 92.

The document process device 120 transports document onto the document set table 92. Also, the document process device 120 is configured to be turnable in the direction of the arrow M so that user can access to the document set table 92 so as to place document thereon manually.

The image data processed on the image forming apparatus 100 is image data from which a color image using black (K), cyan (C), magenta (M) and yellow (Y) can be formed. Therefore, in order to produce four types of latent images in the respective colors, four each of developing devices 2, photoreceptors 3, charging devices S and cleaner units 4 are respectively provided to produce each color. These components constitute four image stations.

The charging device 5 is a charging means for electrically charging the surface of the photoreceptor 3 to a determined potential uniformly. Beside a contactless-type charging device as illustrated in FIG. 3, the charging device 5 may be a contact-type charging device such as a roller type or brush type charging device.

The exposure unit 1 irradiates light on the charged photoreceptor 3 according to the input image data, thereby producing an electrostatic latent image on its surface according to the image data. In the present embodiment, the exposure unit 1 is configured as a laser scanning unit (LSU) having a laser beam emitting portion, a reflecting mirror and the like. In the exposure unit 1, a polygon mirror for scanning the laser beam and optical elements such as lens, mirror and the like are arranged, the optical elements leading the laser beam reflected by the polygon mirror to the photoreceptor 3. The configuration of the light scanning device which constitutes the exposure unit 1 will be described later in detail. The exposure unit 1 may be an EL or LED writing head in which an alley of light emitting elements is provided.

The developing devices 2 visualize the electrostatic latent images produced on each photoreceptor 3 by the toners of four colors (YMCK).

In the present embodiment, the photoreceptor 3 is drum shaped and supported so that it can be rotated about an axis by a drive means (not shown).

The cleaner units 4 remove and collect the toner remained on the surface of the photoreceptors 3 after the development and transfer of the image.

The intermediate transfer belt unit 6 disposed above the photoreceptors 3 includes an intermediate transfer belt 61, an intermediate transfer belt driving roller 62, an intermediate transfer belt driven roller 63, intermediate transfer rollers 64 and an intermediate transfer belt cleaning unit 65. Four of the intermediate transfer rollers 64 are provided correspondingly to each color for YMCK.

The intermediate transfer belt driving roller 62, the intermediate transfer belt driven roller 63 and the intermediate transfer rollers 64 rotate the intermediate transfer belt 61 in tension. Also, the respective intermediate transfer rollers 64 apply transfer bias to transfer the toner image on the corresponding photoreceptor 3 to the intermediate transfer belt 61.

The intermediate transfer belt 61 is provided in contact with the respective photoreceptors 3. The toner images of each color produced on the photoreceptors 3 are sequentially transferred to the intermediate transfer belt 61 so that the toner images overlap with each other. Consequently, a color toner image (multi color toner image) is produced on the intermediate transfer belt 61. The intermediate transfer belt 61 is made of, for example, an endless film having the thickness of approximately 100 μm to 150 μm.

The transfer of the toner images from the photoreceptor drums 3 to the intermediate transfer belt 61 is performed by the intermediate transfer rollers 64 which are in contact with the back side of the intermediate transfer belt 61. A high voltage transfer bias to transfer toner image (high voltage of reverse polarity (+) with respect to the electrostatic charge (−) of the toner) is applied to the intermediate transfer rollers 64. The intermediate transfer rollers 64 are based on metal shafts (e.g. Stainless steel), each having a diameter of 8-10 mm, and the surfaces of the intermediate transfer rollers 64 are coated with conductive elastic material (e.g. EPDM, urethane foam and the like). The conductive elastic material allows the uniform application of high voltage to the intermediate transfer belt 61. Although the roller shaped transfer electrodes are used in the embodiment, brush shaped transfer electrodes etc. can also be used.

As described above, the electrostatic images visualized on the respective photoreceptors correspondingly to each color are stacked on the intermediate transfer belt 61. Through the rotation of the intermediate transfer belt 61, the stacked image information is transferred on the sheet by the transfer roller 10 disposed in the contact position between a sheet and the intermediate transfer belt 61.

The intermediate transfer belt 61 and the transfer roller 10 are pressed against each other with a predetermined nip and a voltage to transfer the toner to the sheet (high voltage of reverse polarity (+) with respect to the electrostatic charge (−) of the toner) is applied to the transfer roller 10. In order for the transfer roller 10 to obtain said nip constantly, either one of the transfer roller 10 and the intermediate transfer belt driving roller 62 is made of hard material (metal etc.) and another one is made of soft material such as elastic roller etc. (elastic rubber roller or expandable resin roller).

As described above, a toner would attach to the intermediate transfer belt 61 when the intermediate transfer belt 61 makes contact with the photoreceptor drum 3, or a toner would remain on the intermediate transfer belt 61 even after the transfer to the sheet by the transfer roller 10. Such attached or remained toner will cause the mixture of colors of the toners in a subsequent process. Therefore, the toner is removed and collected by the intermediate transfer belt cleaning unit 65. The intermediate transfer belt cleaning unit 65 comprises for example a cleaning blade as a cleaning component. The cleaning blade makes contact with the intermediate transfer belt 61. The intermediate transfer belt 61 contacted by the cleaning blade is supported on the reverse side by the intermediate transfer belt driven roller 63.

The paper feeding cassette 81 is a tray for holding the sheets (recording paper) used for image formation and is arranged below the exposure unit 1 of the main body 110. Also, the sheets used for image formation can be set in a manual paper feeding cassette 82. A paper output tray (not shown) provided to an upper part of the main body 110 is a tray on which the printed sheets are accumulated in a face-dawn manner.

Also the main body 110 includes a paper carrying path S in substantially vertical form to carry the sheets from the paper feeding cassette 81 or in the manual paper feeding cassette 82 to the paper output tray via the transfer roller 10 and the fixing unit 7. Pick up rollers 11*a*, 11*b*, a plurality of carrying rollers 12*a* to 12*d*, a registration roller 13, the transfer roller 10 and the fixing unit 7 etc. are arranged in the vicinity of that part of the paper carrying path S which is from the paper feeding cassette 81 or the manual paper feeding cassette 82 to a paper output tray 91.

The pick up roller 11*a* is disposed in the vicinity of the edge of the paper feeding cassette 81 and is configured to pick up sheets one by one from the paper feeding cassette 81 and to feed to the paper carrying path S. Likewise, the pick up roller 11*b* is disposed in the vicinity of the edge of the manual paper feeding cassette 82 and is configured to pick up sheets one by one from the manual paper feeding cassette 82 and to feed to the paper carrying path S.

Pluralities of the carrying rollers 12*a* to 12*d* are rollers for facilitating and assisting the transport of sheets and disposed along the paper carrying path S.

Also, the registration roller 13 temporally holds the sheet in the path S and transports the sheet to the transfer roller 10 at such a timing that the tip of the toner image on the photoreceptor 3 is matched with the tip of the sheet.

The fixing unit 7 comprises a heat roller 71 and a pressure roller 72, which rotate with a sheet sandwiched therebetween. The heat roller 71 is set to a predetermined constant temperature based on the signal from a thermal sensing device (not shown) by a control portion. The multi color toner image transferred on the sheet are melted, mixed and pressed by the heat roller 71, which perform thermal compression of the toner by working together with the pressure roller 72. As the result, the multi color toner image is thermally fixed to the sheet. An external heating belt 73 for heating externally the heat roller 71 is also provided. Further, the fixing unit 7 has a post-fixation roller as well as a post-fixation driven roller which is driven by the post-fixation roller to carry the sheet. The post-fixation roller and the post-fixation driven roller sandwich a sheet and rotate to carry it. In order to rotate the fixing roller and the post-fixation roller, a motor rotates a gear in the paper output unit to cause the rotation of a drive gear of the fixing roller.

The paper carrying path S will be described below in detail. As described above, the image forming apparatus 100 is provided with the paper feeding cassette 81 for holding sheets beforehand and the manual paper feeding cassette 82. In order to feed sheets from the paper feeding cassettes 81, 82, the pick up rollers 11*a*, 11*b* are respectively arranged to lead sheets one by one to the paper carrying path S.

The sheet transported from the respective paper feeding cassettes 81 and 82 is carried to the registration roller 13 by means of the carrying roller 12*a* in the paper carrying path S and then carried to the transfer roller 10 at such a timing that the tip of the sheet is matched with the tip of the image information on the intermediate transfer belt 61. Then, the image information is written on the sheet. Subsequently, the sheet passes through the fixing unit 7 such that the not-fixed toner on the sheet is melt with heat and fixed on the sheet. Via the carrying roller 12*b* disposed downstream, the sheet is finally output on the paper output tray 91.

The paper carrying path S is used when one-side printing to the sheet is performed. In case of two-side printing on the other hand, when, after the completion of the one-side printing as described above, the sheet has passed through the fixing unit 7 and the back end of the sheet is grasped by the last carrying roller 12*b*, the carrying roller 12*b* rotates in the reverse direction and leads the sheet to the carrying rollers 12*c* and 12*d*. After the sheet passes through the registration roller 13 and the printing is performed on the back surface of the sheet, the sheet is output on the paper output tray 91.

Even if the glossy paper 200 according to the present embodiment is loaded in the paper feeding cassette 81 or the manual paper feeding cassette 82, the back surface 202 of the glossy paper 200 is rough-surfaced so that it is unlikely to cause paper feeding defect, such as multi feed, mispick, slip, jam or the like. Therefore the glossy paper can be transported one by one and an image is produced thereon even when the glossy paper 200 is continuously fed.

Figure 4:
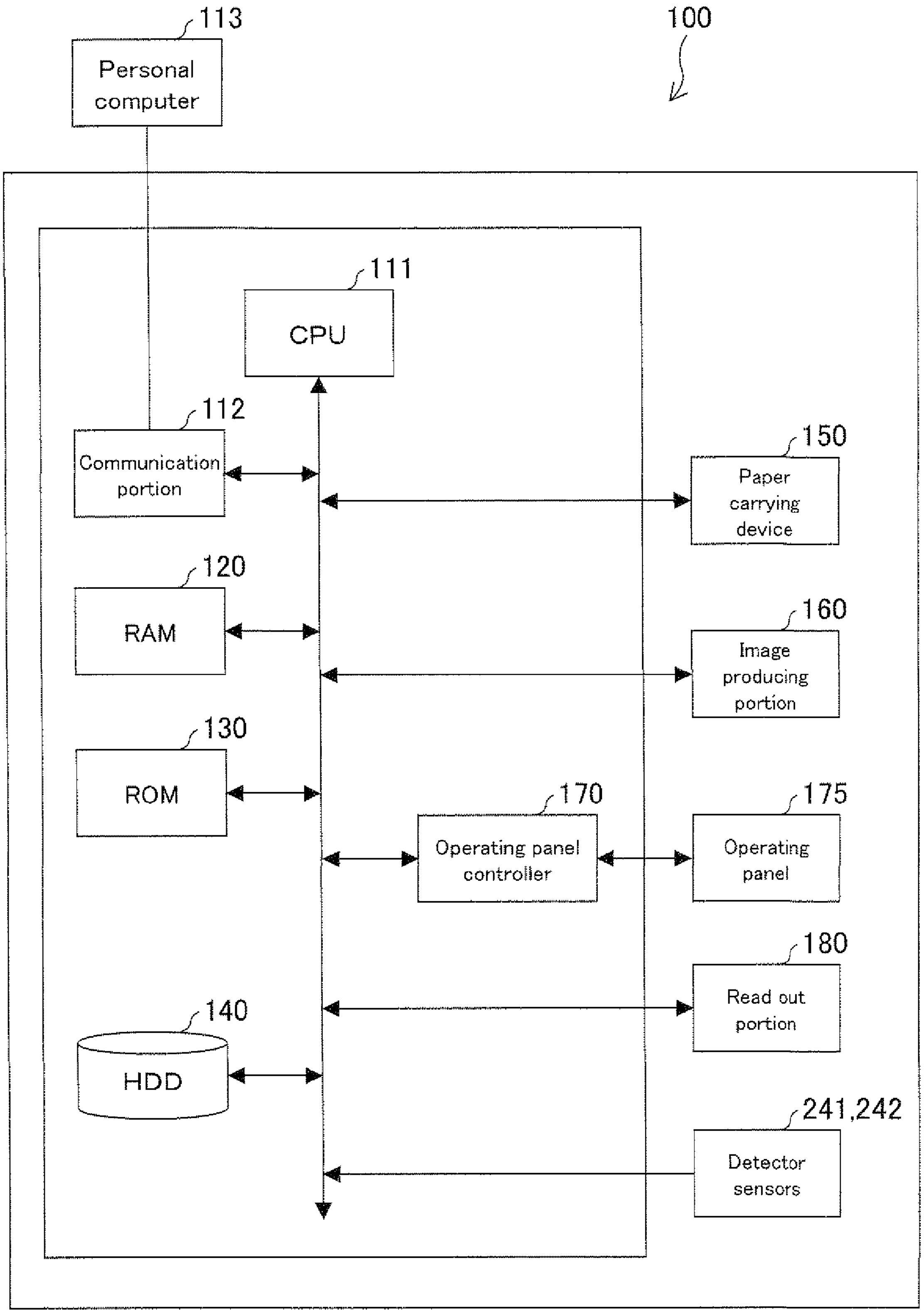
FIG. 4 is a block diagram illustrating a digital multifunction printer as an example of the image forming apparatus.

FIG. 4 shows a block diagram of a digital multifunction printer as an example of the image forming apparatus 100. The image forming apparatus 100 comprises a CPU 111, a RAM 120, a ROM 130, an HDD 140, a paper carrying device 150, an image producing portion 160, an operating panel controller 170, an operating panel 175, a read out portion 180 and detector sensors 241 and 242.

The CPU 111 controls the RAM 120, the ROM 130, the HDD 140, the paper carrying device 150, the image producing portion 160, the operating panel controller 170, the read out portion 180 and the detector sensors 241, 242 as a whole.

The RAM 120 is used as a working area of the CPU 111. The ROM 130 stores a program to be executed by the CPU 111. HDD 140 stores spools of printing data and printing data after analysis. The paper carrying device 150 transports paper from the paper feeding portion to the paper output portion.

The image producing portion 160 produces an image on the transported paper. The operating panel controller 170 controls the display of the operating panel 175. The read out portion 180 reads out the image information of the paper placed on the read out portion 180. The detector sensors 241 and 242 are provided to detect transport error of the paper. A communication portion 112 is connected to a network NW or an Internet IN via a communication cable etc. and is further connected to a terminal device 113 such as a personal computer (PC) via the network NW. The communication portion 112 receives the image data from the terminal device 113 via the network NW etc. The image data received at the communication portion 112 is forwarded to the RAM and the HDD per page. Then, the image data is held there temporally and is transmitted to the image producing portion 160, thereby being printed out.

The present embodiment discusses the case where the glossy paper according to the present invention is used in an electrophotographic image forming apparatus. However the glossy paper according to the present invention can be used in other type of image forming apparatus.

EXAMPLE

The following description explains an experiment performed as an Example of the present invention.

In this Example, a digital full color machine (Sharp Kabushiki Kaisha: MX-3500, MX-4500) having printing speed of 35 to 45 CPM was used as an image forming device to observe the paper feeding capabilities with regard to the glossy paper under the high-temperature and high-humidity environment. The use environment conditions for the main body of the device was as follows: The temperature range of 10 to 35° C. and the humidity range of 20 to 85% RH. In the measurements below, the image forming device was operated at the printing speed of 83.5 mm/ s.

The image forming device was used to observe the paper feeding capabilities with regard to the glossy paper having various degrees of smoothness respectively under the high-temperature and high-humidity environment (under the temperature of 25° C.-35° C. and the humidity of 50-90% RH). One type of the glossy paper observed was not embossed and had a degree of smoothness of 3, 8 kPa (kilopascal) measured by a smoothter and other types of the glossy paper observed were embossed on the back surface (on the opposite surface of the image formation surface), having degrees of smoothness of 12, 14, 15, 16, 17, 20, 25, 30, 35 kPa (kilopascal) measured by a smoothter. All types of the glossy paper have a weight of 157 g/m$^2$ (and a thickness of 157 μm) and the embossed pattern of the embossed glossy paper is, as shown in FIG. 2(*a*), in diamond. For the evaluation, the glossy paper was loaded on the paper feeding cassette of the device and one thousand sheets of the paper were fed continuously under the use environment of the device. As the results, the occurrences of (1) paper feeding slip, (2) jam or mispick and (3) multi feeding were observed. If none of (1)-(3) were occurred, it was rated as excellent and labeled with "○", if (1) was occurred and (2) and (3) were not occurred thereby posing no great disturbance, it was rated as satisfactory and labeled with "Δ" and if either (2) or (3) was occurred, it was rated as bad and labeled with "X". The table 1 shows the evaluation results of the paper feeding capabilities with regard to the glossy paper.

TABLE 1

| Embossing | Degree of smoothness measured by a smoothter(Kpa) | Paper feeding capability |
|---|---|---|
| Without | 3 | X |
| Embossing | 8 | X |
| With Embossing | 12 | X |
| | 14 | X |
| | 15 | X |
| | 16 | Δ |
| | 17 | Δ |
| | 20 | ○ |
| | 25 | ○ |
| | 30 | ○ |
| | 35 | ○ |

From the results shown in the table 1, it can be understood that the continuous paper feeding is achieved by rough-surfacing (embossing) on the back surface of glossy paper (on the opposite surface of the image formation surface) so as to have high degrees of smoothness. It is because the adhesion area between the sheets of the glossy paper was reduced and air vent from between the sheets of the glossy paper was ensured to prevent the paper from adhering together thereby avoiding the problem caused during the paper feeding. The table 1 also shows that it was preferable that the rough-surface (embossed surface) which is a back surface of the glossy paper preferably had a degree of smoothness of 16 kPa or greater, and further preferably a degree of smoothness of 20 kPa or greater measured by a smoothter, in order to prevent the adhesion between the glossy paper and to avoid the problems caused when feeding the paper.

Next, the back surface of the glossy paper having a weight of 157 g/m$^2$ (and a thickness of 157 μm) was rough-surfaced (embossed in this case) so as to have a degree of smoothness of 7 kPa or greater measured by a smoothter. The roughness of the back surface (Rz max) was measured. Furthermore, visual inspection was conducted to identify whether the surface was a top side or a back side. Moreover, it was determined whether or not the embossed pattern affected on the image formation surface (image quality). For comparison, the same measurement, identification and determination were performed with regard to the not-embossed glossy paper having a weight of 157 g/m$^2$ (and a thickness of 157 μm). Regarding the roughnesses of the back surfaces, values Rz max were measured fifty times by using the surface roughness gauge and averaged. Regarding the identification with the visual inspection whether the surface was a top side or a back side, as the results, if the top/back sides were clearly and correctly identified, it was rated as excellent and labeled with "○", if the top/back sides were substantially correct identified, it was rated as satisfactory and labeled with "Δ" and if the top/back sides were mistaken, it was rated as bad and labeled with "X". Regarding the affect of the embossed pattern, as the results, an image was printed on the image formation surface of the glossy paper and observed visually. As the results, if the embossed pattern did not affect the printed image to the extent that the effect from the embossed pattern onto the printed image was noticeable (the image quality was not deteriorated), it was rated as excellent and labeled with "○", if the effect of the embossed pattern on to the printed image was not so noticeable (the image quality was hardly deteriorated) it was rated as satisfactory and labeled with "Δ" and if the effect of the embossed pattern onto the printed image was noticeable (the image quality was deteriorated) it was rated as bad and labeled with "X". Furthermore, the ratio of the maximum depth of the depression in the embossed pattern to the thickness of the glossy paper was determined from the measured roughness of the back surface In the comparative example, the ratio of the depth of the greatest depression of the not-embossed glossy paper to the thickness thereof was determined.

The result is shown in the following table 2.

TABLE 2

| Embossing | Surface roughness RZ max [μm] | Visual inspection whether the surface was top/back side | Effect of the embossed pattern on the image formation surface (image quality) | Ratio of the depth of the embossed pattern to the thickness of the paper [%] |
|---|---|---|---|---|
| Without | 3 | — | ○ | 2.0 |
| Embossing | 6 | — | ○ | 4.0 |
| With | 7 | X | ○ | 4.7 |
| embossing | 8 | X | ○ | 5.3 |
| | 9 | Δ | ○ | 6.0 |
| | 10 | ○ | ○ | 6.7 |
| | 11 | ○ | ○ | 7.3 |
| | 12 | ○ | ○ | 8.0 |
| | 13 | ○ | ○ | 8.7 |
| | 14 | ○ | ○ | 9.3 |
| | 15 | ○ | ○ | 10.0 |
| | 16 | ○ | Δ | 10.7 |
| | 17 | ○ | Δ | 11.3 |
| | 18 | ○ | X | 12.0 |
| | 19 | ○ | X | 12.7 |
| | 20 | ○ | X | 13.3 |

It was understood from the Table 2 that when a back surface of the glossy paper was rough-surfaced (embossed) such that the ratio of the maximum depth of the depression in the rough-surface to the thickness of the glossy paper is not less than 6.0% and not more than 11.3%, more preferably not less than 6.7% and not more than 10.0%, a user can visually identify top/back sides (i.e. a user does not make a mistake when selecting top/back side) and obtain high image quality that the embossed pattern does not affect the image formation surface. In fact, in the glossy paper having a weight of 157 $g/m^2$, a back surface was rough-surfaced (embossed) in such a way that the maximum depth was not less than 9 μm and not more than 17 μm, more preferably not less than 10 μm and not more than 15 μm to achieve the above advantage.

Figure 5:
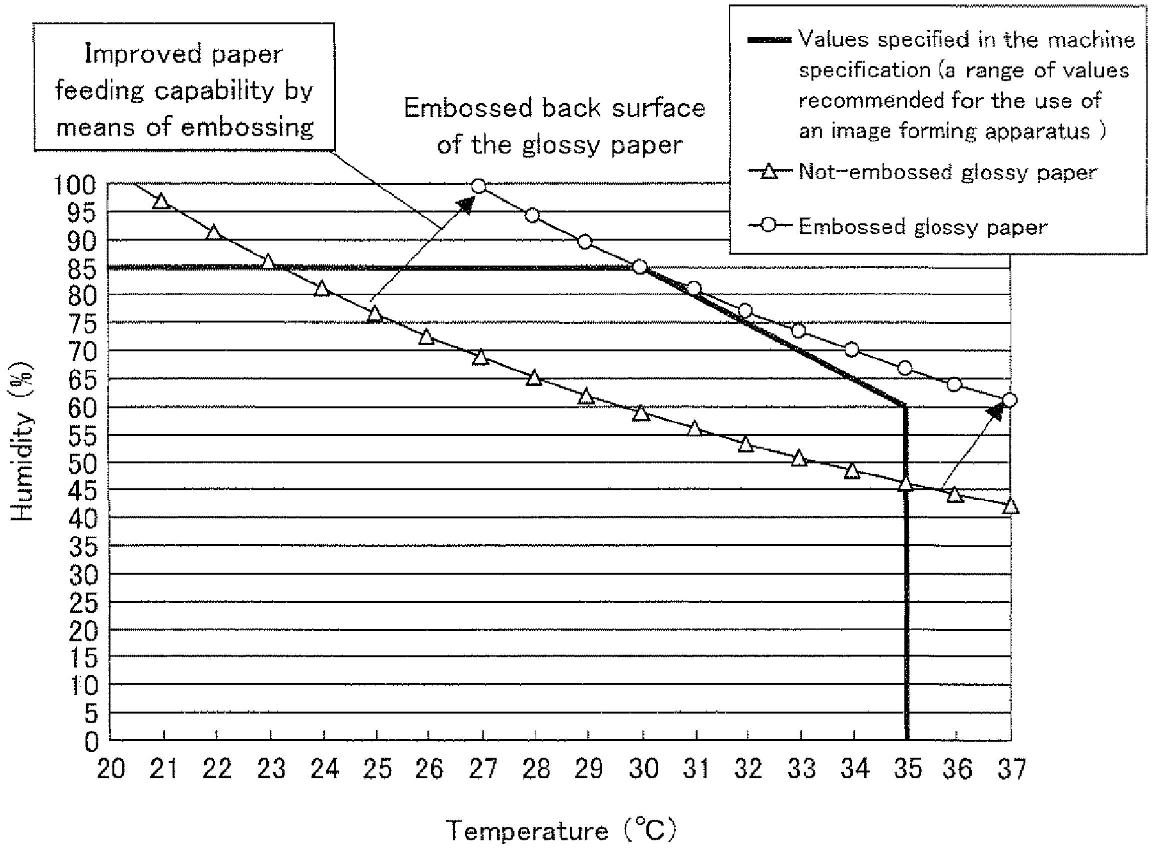
FIG. 5 is a graph demonstrating improvement in paper feeding capability by means of embossing.

Subsequently, one thousand sheets of both embossed glossy paper and not-embossed glossy paper were fed to the digital full color machine at different temperatures, in order to find the humidity at which paper feeding defect was occurred. The embossed glossy paper here was embossed on the back surface and had degrees of smoothness of 20 kPa and roughness of 10 μm of the back surface. The not-embossed glossy paper had degrees of smoothness of 4 kPa and roughness of 4 μm of the back surface. FIG. 5 is a graph diagram showing the result. It is understood from FIG. 5 that the paper feeding capability was increased when the back surface of the glossy paper was embossed.

As described above, in order to solve the problems, the glossy paper for image formation according to the present invention, the glossy paper having a glossed and smooth image formation surface, is arranged such that an opposite surface of an image formation surface is rough-surfaced.

The rough-surfacing on the opposite surface may be carried out by embossing. The embossing allows an easy production of the rough-surfaced opposite surface of the image formation surface of the glossy paper.

In the glossy paper according to the present invention, it is preferable that the opposite surface is 16 kPa (Kilo Pascal) or greater in degree of smoothness, measured by a smoothter. With the degree of smoothness of 16 kPa or greater, the adhesion between glossy paper can further be prevented so that the problem caused during the paper feeding can effectively be avoided and thereby continuous paper feeding being possible.

In the glossy paper according to the present invention, it is preferable that a ratio of a maximum depth of a depression in the rough-surfaced opposite surface to the thickness of the glossy paper is not less than 6.0% and not more than 11.3%. If the ratio of the maximum depth to the thickness of the glossy paper is less than 6.0%, the visual identification of the top/back sides would be difficult and it causes a user to set paper with incorrect side into the paper feeding cassette of the image forming apparatus. Also, if the ratio of the maximum depth to the thickness of the glossy paper is more than 11.3%, the depression affects the image formation surface and deteriorates the quality of the image printed thereon. Therefore, the opposite surface of the image formation surface of the glossy paper is preferably rough-surfaced (embossed.) in such a way that the ratio of the maximum depth of the depression in the rough-surfaced opposite surface to the thickness of the glossy paper is not less than 6.0% and not more than 11.3%, more preferably not less than 6.7% and not more than 10.0%. This scope of the values makes it possible for users to visually identify the top/back sides and to obtain high image quality that the embossed pattern does not affect the image formation surface. In fact, in the glossy paper having a weight of 157 $g/m^2$, the opposite surface of the image formation surface is rough-surfaced (embossed) in such a way that the maximum depth is not less than 9 μm and not more than 17 μm, more preferably not less than 10 μm and not more than 15 μm in order to achieve the above advantage.

In the glossy paper according to the present invention, it is preferable that the depressions in the rough-surfaced opposite surface are provided so as to be connected with one another and aligned. Such a connection makes it possible to achieve good air ventilation between the glossy paper and to effectively avoid the problems caused during the continuous paper feeding by the image forming apparatus.

In addition, the glossy paper according to the present invention can advantageously be used in an electrophotographic image forming apparatus. If the glossy paper according to the present invention has a degree of smoothness within the above defined scope and has a ratio of the maximum depth of the depression in the rough-surfaced opposite surface to the thickness of the glossy paper within the above defined scope, the occurrences of the paper feeding defects can be prevented and an image can be produced on the glossy paper in an advantageous manner without the rough-surfacing affecting the image formation surface.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below. It will be understood that the present invention includes even the range of numerical values other than that described in the present specification if the range is the rational one within the spirit of the present invention.

The present invention can be advantageously applied to the glossy paper for image formation, in particular by an electro-photographic system.

What is claimed is:

1. Glossy paper for image formation, the glossy paper having a glossed and smooth image formation surface, wherein an opposite surface of the image formation surface is rough-surfaced, the rough-surfacing on the opposite surface being carried out by embossing in a diamond pattern, the diamond pattern being provided on the glossy paper from end to end, the diamond pattern including (i) a plurality of depressions aligned with one another and (ii) diamond-shaped raises each of which is surrounded on four sides by corresponding one of the plurality of depressions; and wherein the opposite surface has a degree of smoothness of 16 kPa or greater, which is measured by a smoothter.

2. The glossy paper according to claim 1, wherein a ratio of a maximum depth of the plurality of depressions in the opposite surface to a thickness of the glossy paper is not less than 6.0% and not more than 11.3%.

3. The glossy paper according to claim 1, for use in an image forming apparatus of electrophotographic type.

* * * * *